(12) United States Patent
Martins Neto

(10) Patent No.: US 9,704,620 B2
(45) Date of Patent: Jul. 11, 2017

(54) CABLE GLAND WITH PRESSURE INDICATOR

(71) Applicant: João Martins Neto, Centenário Duque de Caxias/RJ (BR)

(72) Inventor: João Martins Neto, Centenário Duque de Caxias/RJ (BR)

( * ) Notice: Subject to any disclaimer, the term of this patent is extended or adjusted under 35 U.S.C. 154(b) by 299 days.

(21) Appl. No.: 14/407,502

(22) PCT Filed: Jun. 14, 2013

(86) PCT No.: PCT/BR2013/000212
§ 371 (c)(1),
(2) Date: Dec. 12, 2014

(87) PCT Pub. No.: WO2013/185200
PCT Pub. Date: Dec. 19, 2013

(65) Prior Publication Data
US 2015/0155079 A1    Jun. 4, 2015

(30) Foreign Application Priority Data

Jun. 15, 2012  (BR) .......................... 20 2012 014504
Oct. 9, 2012   (BR) .......................... 20 2012 025764

(51) Int. Cl.
| | |
|---|---|
| H01B 17/58 | (2006.01) |
| F16L 5/06 | (2006.01) |
| H02G 3/06 | (2006.01) |
| H02G 15/013 | (2006.01) |
| H02G 3/22 | (2006.01) |

(52) U.S. Cl.
CPC .............. *H01B 17/586* (2013.01); *F16L 5/06* (2013.01); *H02G 3/0675* (2013.01); *H02G 15/013* (2013.01); *H02G 3/22* (2013.01)

(58) Field of Classification Search
None
See application file for complete search history.

(56) References Cited

U.S. PATENT DOCUMENTS 4,209,228 A *  6/1980  Chikama ................ G02B 23/26
                                                   385/117
4,355,920 A * 10/1982  Graham .................. F16C 1/226
                                                   403/195

(Continued)

FOREIGN PATENT DOCUMENTS

EP      0515200 A1    5/1992

OTHER PUBLICATIONS

International Search Report issued in PCT/BR2013/000212 dated Aug. 8, 2013 (Aug. 8, 2013).

*Primary Examiner* — Chau N Nguyen
*Assistant Examiner* — Muhammed Azam
(74) *Attorney, Agent, or Firm* — Nath, Goldberg & Meyer; Jerald L. Meyer

(57) ABSTRACT

The cable gland with pressure indicator of the present invention comprehends a scale (12) disposed on the sleeve (5) that fits in a body (4), the referred body (4) comprising an optical element box (14) with an optical element (13) inserted in section of its outer surface (16), the positioning of the referred section being determined in a way that the optical element box (14) is positioned above the scale (12) disposed on the sleeve (5), the outer body surface section (4) comprising a reference ring (16).

12 Claims, 15 Drawing Sheets

(56) References Cited

U.S. PATENT DOCUMENTS

| | | | | |
|---|---|---|---|---|
| 4,358,079 A * | 11/1982 | Navarro | F16L 5/06 174/665 |
| 4,629,825 A * | 12/1986 | Lackinger | H02G 15/04 174/654 |
| RE32,678 E * | 5/1988 | Benscoter | H02G 3/22 174/482 |
| 4,787,657 A * | 11/1988 | Henniger | H02G 3/0658 174/660 |
| 5,037,140 A * | 8/1991 | Anderson | A62C 35/68 285/139.2 |
| 5,249,248 A * | 9/1993 | Arroyo | H01B 7/288 174/120 SR |
| 5,297,227 A * | 3/1994 | Brown | G02B 6/3825 385/138 |
| 5,342,096 A * | 8/1994 | Bachle | F16L 19/0212 277/622 |
| 5,410,102 A * | 4/1995 | Guiol | H01R 4/646 174/142 |
| 5,595,453 A * | 1/1997 | Nattel | E04C 3/32 174/136 |
| 5,600,094 A * | 2/1997 | McCabe | F16L 5/06 174/653 |
| 5,621,191 A * | 4/1997 | Norris | H02G 3/0675 174/653 |
| 5,637,827 A * | 6/1997 | Goch | G02B 6/442 174/15.3 |
| 5,648,639 A * | 7/1997 | Hand | H01R 4/60 174/51 |
| 5,691,505 A * | 11/1997 | Norris | H02G 15/04 174/51 |
| 5,720,556 A * | 2/1998 | Krellner | G01K 1/16 338/28 |
| 5,766,037 A * | 6/1998 | Nelson | H01R 24/564 439/583 |
| 5,799,988 A * | 9/1998 | Yeh | F16L 25/0045 285/139.1 |
| 5,866,853 A * | 2/1999 | Sheehan | H02G 3/0675 174/153 R |
| 5,934,937 A * | 8/1999 | McCarthy | H01R 4/5033 439/427 |
| 5,982,971 A * | 11/1999 | Amirkalali | G02B 6/4427 385/135 |
| 6,034,325 A * | 3/2000 | Nattel | H01R 9/03 174/59 |
| 6,043,432 A * | 3/2000 | Gretz | H02G 3/0691 16/2.1 |
| 6,045,261 A * | 4/2000 | Rossum | G01K 7/16 174/73.1 |
| 6,069,320 A * | 5/2000 | Rocci | H01R 4/70 174/84 R |
| 6,268,565 B1 * | 7/2001 | Daoud | G02B 6/4471 174/657 |
| 6,523,986 B1 * | 2/2003 | Hoffmann | E04F 19/02 362/153 |
| 6,605,781 B2 * | 8/2003 | Milanowski | G02B 6/3887 174/74 R |
| 6,734,355 B1 * | 5/2004 | Auclair | H01R 9/0512 174/135 |
| 6,855,888 B2 * | 2/2005 | Jacke | H01R 13/59 174/84 R |
| 6,872,886 B2 * | 3/2005 | Kiely | H02G 3/0691 16/2.1 |
| 7,207,820 B1 * | 4/2007 | Montena | H01R 13/5219 439/275 |
| 7,498,516 B1 * | 3/2009 | He | A61N 1/3754 174/94 R |
| 7,633,011 B2 * | 12/2009 | Bolante | H02G 15/10 174/84 R |
| 7,650,055 B2 * | 1/2010 | Cox | G02B 6/4444 174/60 |
| 7,735,876 B2 * | 6/2010 | Chiu | F16L 5/00 174/655 |
| 7,805,999 B2 * | 10/2010 | Waid | E21B 47/06 73/700 |
| 7,909,366 B1 * | 3/2011 | Hall | F16L 5/06 285/148.28 |
| 7,952,034 B2 * | 5/2011 | Kiely | H02G 3/0683 174/650 |
| 8,313,250 B2 * | 11/2012 | Drouard | G02B 6/4477 174/520 |
| 8,513,543 B1 * | 8/2013 | Lin | H02G 15/013 174/656 |
| 8,586,881 B1 * | 11/2013 | Shemtov | F16L 19/061 174/652 |
| 9,196,976 B2 * | 11/2015 | De France | H01R 9/0512 |
| 9,252,585 B2 * | 2/2016 | Schlachter | H02G 15/007 |
| 9,450,328 B2 * | 9/2016 | Lindkamp | H01R 13/512 |
| 2002/0149157 A1 * | 10/2002 | Milanowski | G02B 6/4444 277/607 |
| 2002/0191941 A1 * | 12/2002 | Milanowski | H02G 15/113 385/135 |
| 2003/0019649 A1 * | 1/2003 | Rubenstein | H02G 3/0666 174/654 |
| 2004/0208467 A1 * | 10/2004 | Rodrigues | H02G 15/113 385/135 |
| 2004/0231881 A1 * | 11/2004 | Muller | H02G 15/007 174/93 |
| 2005/0077725 A1 * | 4/2005 | Bartholoma | F16L 5/027 285/143.1 |
| 2005/0150679 A1 * | 7/2005 | Grogl | H01B 3/28 174/120 R |
| 2005/0227526 A1 * | 10/2005 | Hopper | G01K 1/14 439/302 |
| 2006/0054874 A1 * | 3/2006 | Oberli | H02G 1/086 254/134.4 |
| 2007/0023200 A1 * | 2/2007 | Michiels | H02G 15/113 174/93 |
| 2007/0113659 A1 * | 5/2007 | Mueller | G01L 19/147 73/714 |
| 2007/0253673 A1 * | 11/2007 | Nielsen | A61N 1/3754 385/138 |
| 2008/0073118 A1 * | 3/2008 | Drotleff | H02G 15/007 174/655 |
| 2008/0224419 A1 * | 9/2008 | Mullaney | F16L 5/08 277/602 |
| 2008/0230996 A1 * | 9/2008 | Sylvan | F16L 5/10 277/315 |
| 2008/0257112 A1 * | 10/2008 | Stepan | H02G 1/1265 81/9.51 |
| 2009/0025977 A1 * | 1/2009 | Anderson | H02G 3/0675 174/653 |
| 2009/0057008 A1 * | 3/2009 | Knorr | G02B 6/4444 174/652 |
| 2009/0126482 A1 * | 5/2009 | Fundak | A62B 9/006 73/293 |
| 2009/0191752 A1 * | 7/2009 | Montena | H02G 3/0675 439/584 |
| 2009/0288877 A1 * | 11/2009 | Tremaine | H02G 3/22 174/653 |
| 2009/0302547 A1 * | 12/2009 | Roth | H02G 3/22 277/520 |
| 2009/0309313 A1 * | 12/2009 | Knorr | G02B 6/4444 277/626 |
| 2010/0096158 A1 * | 4/2010 | Wheatley | H02G 3/0625 174/68.1 |
| 2010/0186989 A1 * | 7/2010 | Alvelo | H01B 7/18 174/113 R |
| 2010/0194382 A1 * | 8/2010 | Montena | H01R 9/05 324/126 |
| 2010/0307816 A1 * | 12/2010 | Hurrell | F16B 37/067 174/650 |
| 2010/0326678 A1 * | 12/2010 | Monden | A62C 2/06 169/54 |
| 2010/0326700 A1 * | 12/2010 | Xu | H02G 3/0691 174/163 R |
| 2011/0074388 A1 * | 3/2011 | Bowman | H01R 13/6683 324/76.38 |
| 2011/0120766 A1 | 5/2011 | Robb et al. | |

(56) References Cited

U.S. PATENT DOCUMENTS

| | | | |
|---|---|---|---|
| 2011/0147081 A1* | 6/2011 | Best | H02G 3/0633 174/84 R |
| 2011/0226083 A1 | 9/2011 | Chiou | |
| 2011/0309611 A1* | 12/2011 | Smith | F16L 5/06 285/139.3 |
| 2012/0048617 A1* | 3/2012 | Mihara | B60L 3/0069 174/77 R |
| 2012/0211274 A1* | 8/2012 | Drotleff | H02G 3/0666 174/360 |
| 2012/0298415 A1* | 11/2012 | Schwartz | H02G 15/013 174/652 |
| 2012/0298417 A1* | 11/2012 | Kempeneers | G02B 6/4465 174/77 R |
| 2013/0020124 A1* | 1/2013 | Bartholoma | H02G 3/0666 174/654 |
| 2013/0028569 A1* | 1/2013 | Kempeneers | G02B 6/4471 385/139 |
| 2013/0095275 A1* | 4/2013 | Munzenberger | C09D 5/18 428/96 |
| 2013/0153290 A1* | 6/2013 | Schlegel | H02G 3/0658 174/653 |
| 2013/0224989 A1* | 8/2013 | Giefers | H01R 13/512 439/452 |
| 2013/0256467 A1* | 10/2013 | Aumiller | H02G 3/0666 248/49 |
| 2013/0292911 A1* | 11/2013 | Graef | H02G 3/22 277/606 |
| 2014/0138095 A1* | 5/2014 | Vergne | E21B 19/004 166/346 |

\* cited by examiner

CABLE GLAND WITH PRESSURE INDICATOR

This is a National Phase Application filed under 35 U.S.C. 371 as a national stage of PCT/BR2013/000212, filed Jun. 14, 2013, an application claiming the benefit of Brazilian Application Nos. 20 2012 014504-4 filed Jun. 15, 2012 and 20 2012 025764-0 filed Oct. 9, 2012; the content of each of which are hereby incorporated by reference in its entirety.

SUMMARY OF THE INVENTION

The present invention is about a cable gland that indicates to the fitter the exact point of the ideal grip for a proper sealing of the cable used. That way, a standard result for the process is maintained, besides being obtained a record for later inspection.

BACKGROUND OF THE INVENTION

The present invention was created after the use, development and testing of equipment for application in hazardous and non-hazardous atmospheres.

Accompanying and observing preliminary tests, it was noted several times that the lack or excess of grip on cable glands was responsible for failure in the equipment tests.

It was noticed then the need of something in the cable gland that could indicate to the fitter the correct grip that must be applied to the cable gland for each cable type utilized.

The cable gland that constitutes the previous technique refers to an accessory for general electric installations, allowing the installation of cables in electric equipment without changing the level and type of protection of these, for example the cable gland M20 for cables with 8-11.5 mm. Other examples are Type A2, for non-armored cables; Type A2F, identical to A2, however specific for utilization in explosion-proof equipment; Type C, cable gland used in armored cable to provide electrical continuity between the frame and the body of the cable gland, being provided with a sealing ring to the outer cable jacket; Type E1F, used in armored cables to provide electrical continuity between the frame and the body of the cable gland, being provided of two sealing rings, one for the outer jacket and one for the inner jacket of the cable (this model should be specified for utilization in explosion-proof equipment).

There are other less ordered models, with the same functional characteristic.

The cable glands can be manufactured with any material that can be used in its manufacturing, since it can respect requirements prescribed in regulations.

The most common cable gland materials are stainless steel body, brass, nickel plated brass, galvanized carbon steel and polyamide; and elastomeric sealing rings, accompanied of slip rings. Usually, the parts that need grip have hexagonal shape with rounded vertices.

The referred accessory is constituted of two basic pieces, in plug-and-socket screwing system (see FIG. 1). The first piece has at one of its ends an external thread, or body thread, which is used as identification. It relates to the range of diameters of the cables being used, and it connects to others installation elements by screwing to others installation elements, referred first piece receiving, on its another extremity, a second piece.

The most commonly used body threads are the following: Thread NPT and Thread BSP of ½"; ¾"; 1"; 1¼"; 1½"; 2"; 2¼"; 2½"; 3"; Metric thread of M16; M20; M25; M32; M40; M50; M63; M75; and, in smaller scale, Thread Pg type PG7; PG9; PG11; PG13,5; PG16; PG21; PG29; PG36; PG42; PG48.

The body thread determines the preparation of the local for the installation of the cable gland on the equipment. The inside of the base-thread comprises a hollow cylinder with internal screwing in part of its length and linear funneling on its end, starting after the end of the screwing section, until the beginning of the union thread.

The first piece receptions on its interior a sealing and tightening rubber element, with sliding washer, comprising inner sealing ring.

The second piece, screwed on the opposite extremity of the first piece, constitutes an plug element that, as it's screwed to the first piece, compresses the inner sealing ring in a way that the inner diameter of the inner sealing ring decreases and the outer increases, thus tightening and isolating the cable that go through the cable gland.

With the compression exercised by the screwing of the second piece, the outer wall of the inner sealing ring expands over the inner wall of the first piece and further the outer wall of the referred element projects by the inner conical extremity of the first piece, thus progressively restricting the passage space until completely sealing the passage which the cable passes through.

In the whole world, the electrical equipment projected to be utilized in hazardous atmospheres and in non-classified areas (exposed to the action of the environment) need to attend security requirements prescribed in regulations in order to be commercialized.

A hazardous atmosphere consists in an environment where determined proportions of gas, steam, dust or fibbers in contact with the oxygen (oxidant) and a heat source (spark from an electric circuit or heating of an equipment) can provoke an explosion. Therefore, electric equipment installed in these locations should eliminate or isolate the ignition source, preventing the simultaneous occurrence of the three components that form the fire triangle: fuel, oxygen and ignition source. This is of the biggest challenges and worries of the designers.

To prove that the equipment meet the necessary requirements to be commercialized, they pass through a battery of laboratory tests accredited by a governmental agency. If they are approved, a Conformity Certificate is emitted validating the kind and the level of protection that the equipment was projected for.

For these equipment function, is also necessary that there is a safe electric installation. According to the actual norms, there are three allowed installation methods: the American methodology (metallic conduits+explosion proof boxes+sealing units); the European (cables+cable glands); and the mixed system, that provides utilization on the installation of the American and European systems, alternately and according to the verified necessity in each part of the installation.

Among these, the European method is the most used. Its advantages are: great flexibility, economy and quick installation. Said method consists basically in installing the connecting cables on the fasteners. However, there are disadvantages: the system is completely open, subjecting the wiring to eventual damage. Therefore, this method should not be used in locations subject to mechanical damage or chemical agents (in this case is recommended utilization of the mixed system, in which the cables are protected by conduits in locals of exposition to potential mechanical damage and/or chemical). The sealing system of the European method is based in the utilization of accessories known as "cable glands".

The equipment installations should be appropriate for each kind of environment. Then, require inspection by qualified professionals according to specified norms, to maintain the equipment's special characteristics. The cable glands play a very important role in this context, because they are installed at the entrances and the exits of electric cables of the equipment to maintain the integrity of these. Therefore, they need to attend to the prescribed security requirements and possess a conformity agreement emitted by an governmental agency attesting kind and level of protection compatible with these equipment.

Despite every worry about the security of commercialized cable glands, currently do not exist sealing parameters for cable glands that assist the fitter to reproduce the exact sealing point for every cable. The approved cable gland models use for each gauge a small range of electric cables diameters. These accessories are specified by the model of its body thread. Moreover, for each thread gauge is also related the diameter range of the electric cables that can be used.

In the current technique, the sealing is obtained by the effort put on the pressure of the cable gland by the fitter, on his own criteria. This effort can be easily misunderstood with some unseen detritus or even a small damage on the thread fillet. This generates a series of risks that range from electric cable damage by excess clamp, to explosion risk by the false feeling of clamp. Therefore, a special attention should be paid to the sealing functional system of the cable glands.

The main innovation of the present invention consists in eliminate the problem about the sealing of the current cable glands, by the application of elements that determines the effort to be put by the fitter to install the cable gland, in a way to prevent irreversible damage to the installations of industrial plants, residences, condos, etc.

DESCRIPTION OF THE INVENTION

To solve the problems listed in the previous technique, is included on the cable gland a symbols and/or colors scale, related to the exact pressure to be put on the used cable, within the expected range for each cable gland.

Said scale can be made with numbers, cable references, letters, etc. The model with colors is the preferred, according to the preferred modality of the present situation, being the alternation of colors on the scale, shown in the marker, compatible with the cable gland (and consequently with the cables) utilized.

The cable gland can have any size, depending on the cable used. The definition of the scale occurs by testing with the cable gland and its respective cables, in order to determine with precision, the ideal tightening/pressure for each cable, by its corresponding cable gland.

This way, is possible to obtain a standard sealing procedure for each diameter range of the electric cables. It provides, simultaneously, conditions to the fitter for the correct execution of this work and a register that proves that the requirements established are met, facilitating the posterior mounting inspection, that currently is executed without any adequate proof of the equipment's sealing.

The cable gland with pressure indicator of the present invention does not need any training or tool other than the currently used by the fitters. For this invention, a simple model was project, which makes use of its own element that triggers the sealing to show to the fitter the pressure evolution.

Still, the projects mechanism used a minimum amount of material, including to the product items with low manufacturing difficulty. There was obvious concern with the speed in the manufacturing process and product quality, enabling affordable value end product for industries of all sizes.

The object of the present invention consists in a modification to the existing cable glands, of symbols scale or colors recorded directly or inserted into the self-adhesive form in the piece with the plug type screw, mobile or static, responsible for the inner sealing ring pressure of the cable gland; and visit or visualization element on the piece with socket type screw, to calibrate by pressure visualization. As a reference, is added on the outer part of the socket type screw a type of ring with a circular machined groove, or reference ring, with a point on its circumference where is disposed the element of visit or visualization, referred ring also characterized by spinning without loosen stuck by the leading edge of the piece with socket type screw.

As the plug type screw penetrates the socket type screw tightening the inner sealing ring, the scale penetrates the reference ring. To visualize the scale through this ring, is utilized the visit or visualization element that comprehends an open hole that houses a lens of any form that interrupts the reference groove through its center.

As the lens turn around the scale, it can be visualized by any angle and relative position of the user.

DESCRIPTION OF THE FIGURES

The FIGS. 1 and 1a refers to a cable gland from the previous technique in frontal and exploded view;

The FIGS. 2 and 2a refers to the cable gland of the present invention in frontal and exploded technique;

Figure 3:
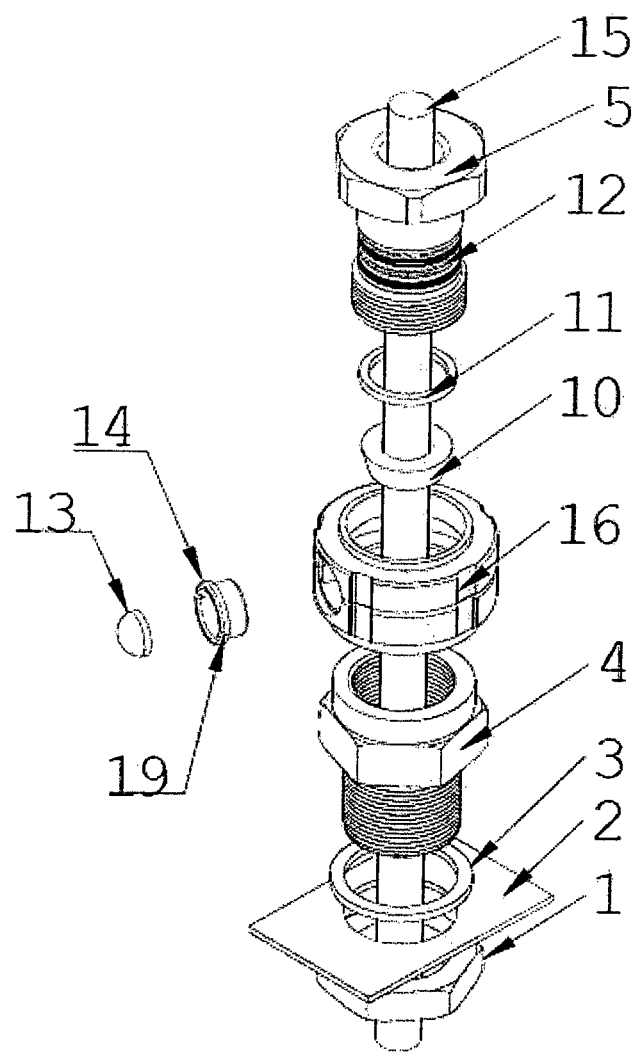
Figure 3A:
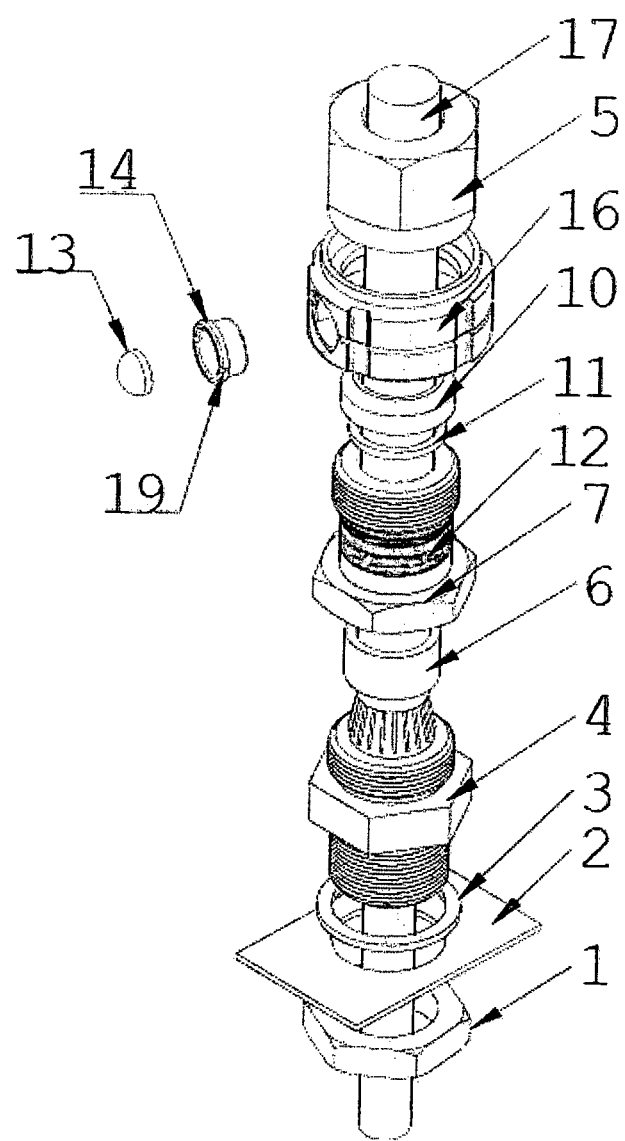
Figure 3B:
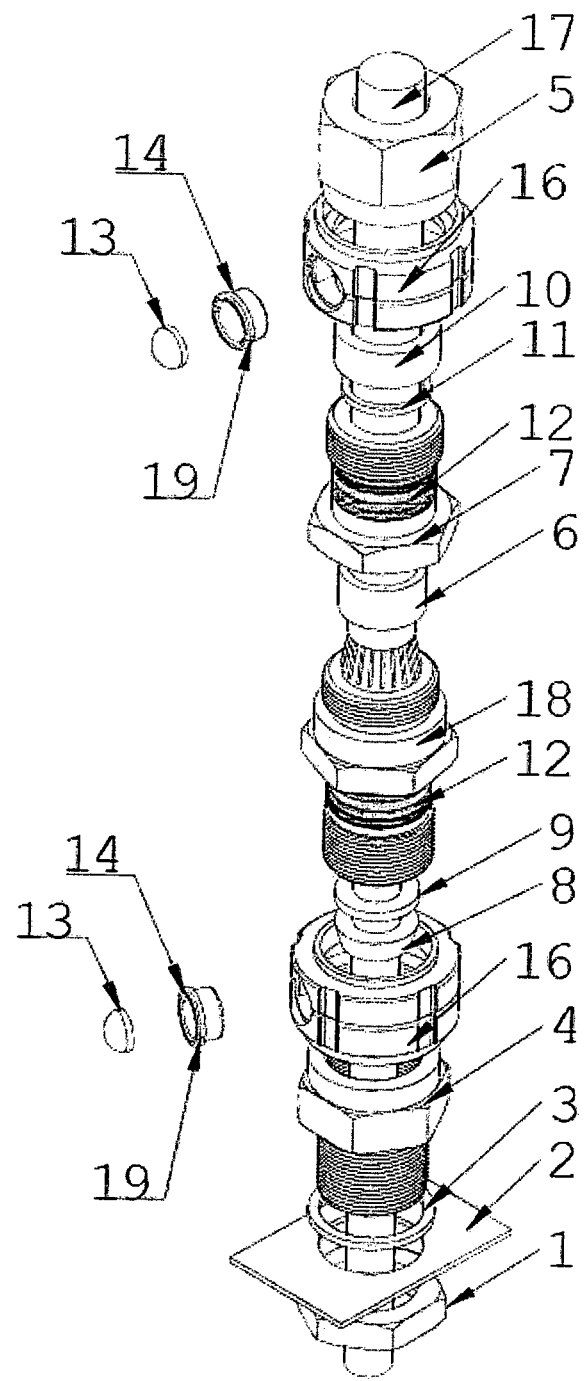

The FIGS. 3, 3a and 3b are exploded views of four modalities of cable glands of the present invention, adapted models from the existing models A2, A2F, C and E1F.

Figure 4:
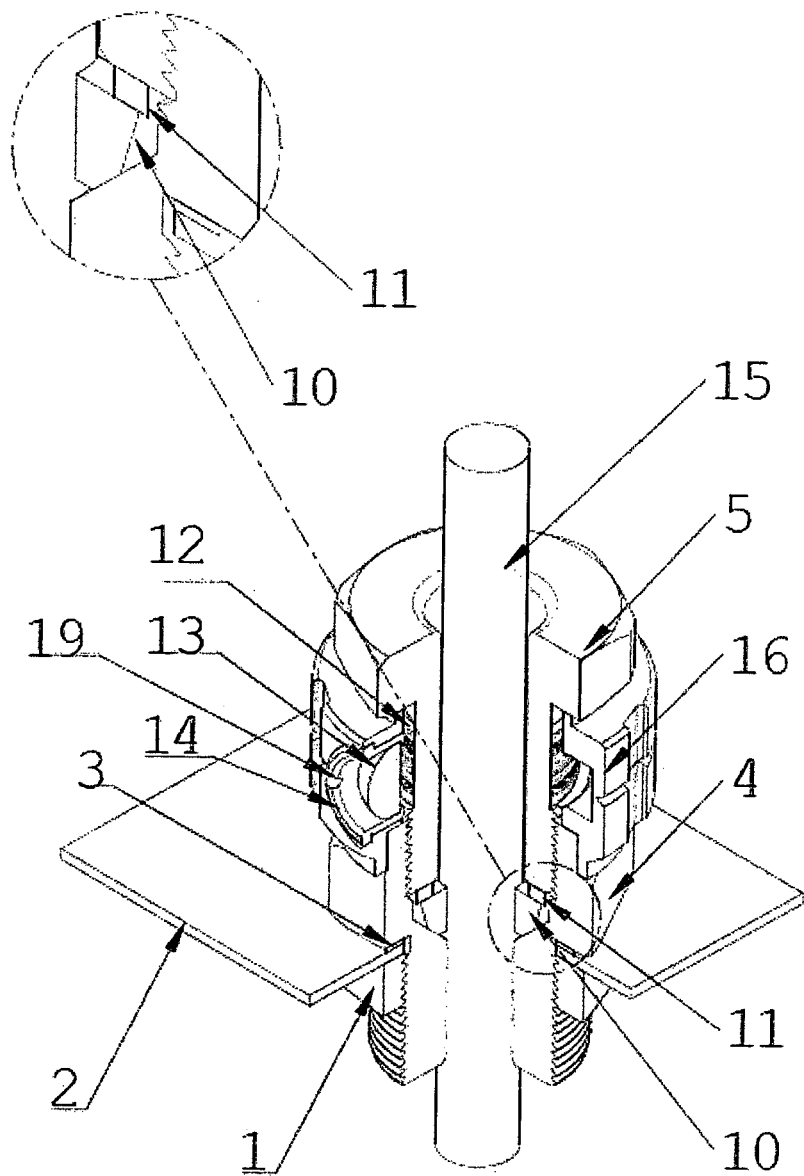
Figure 4A:
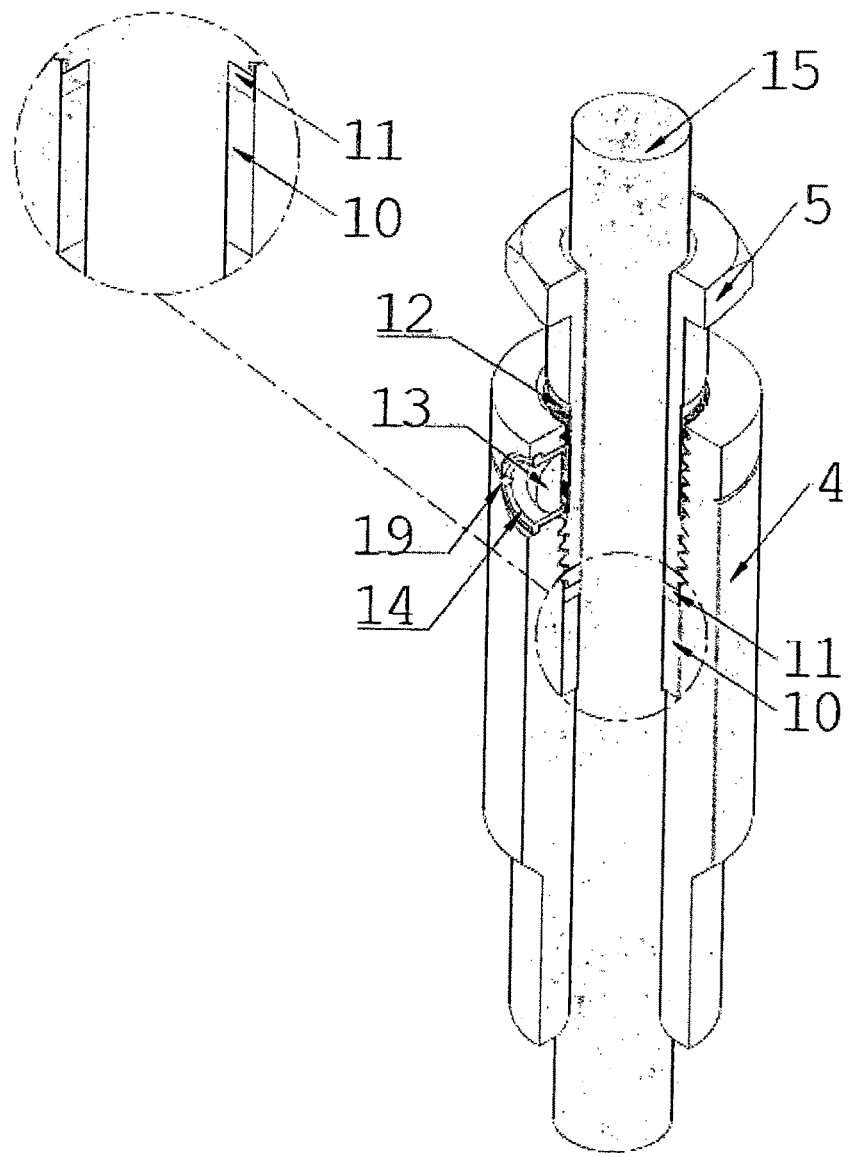
Figure 4B:
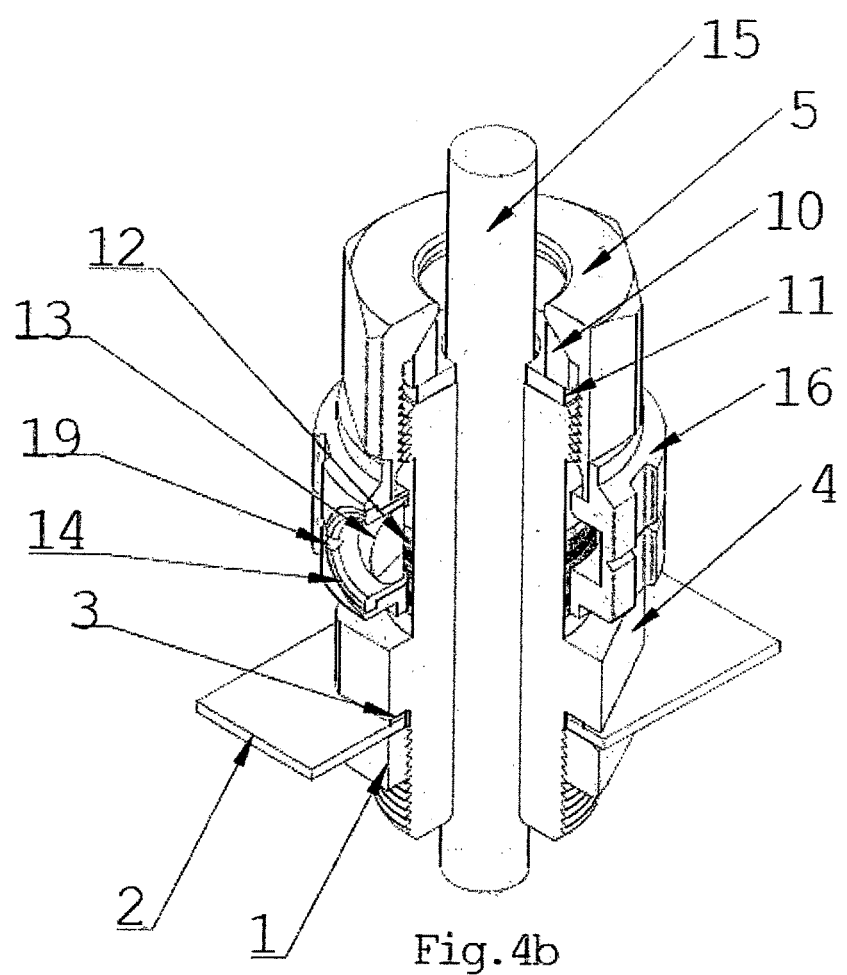
Figure 5A:
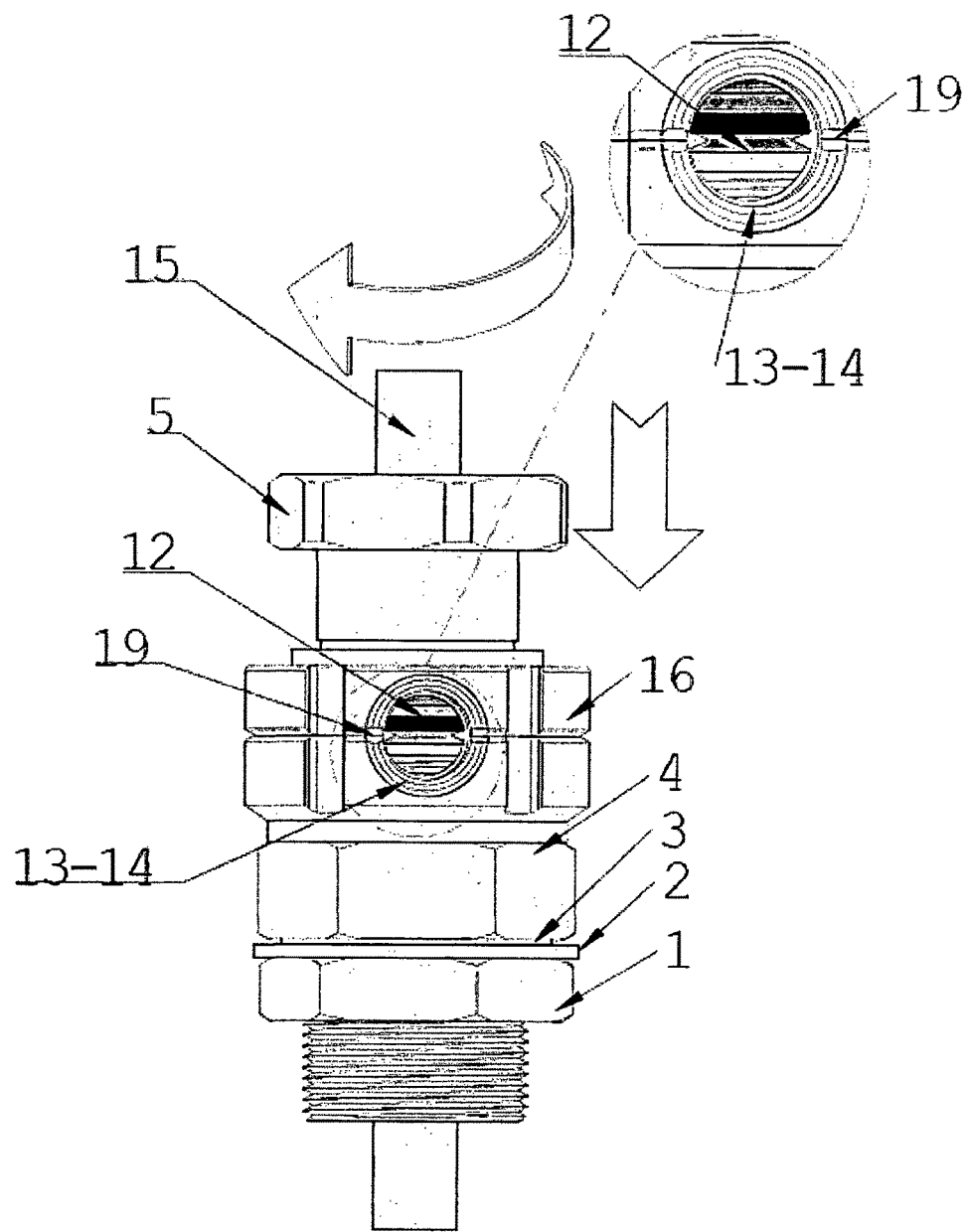
Figure 5B:
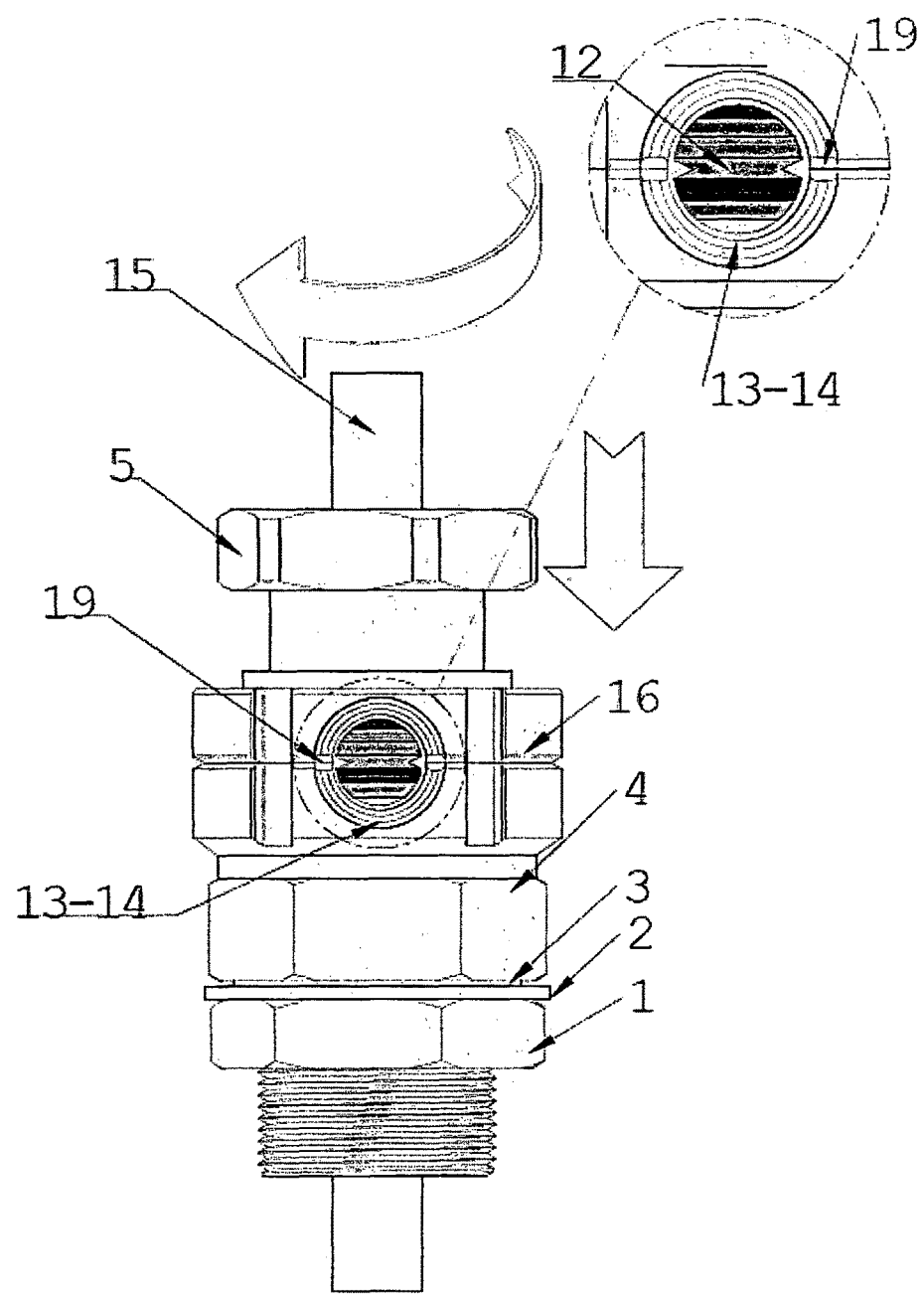
Figure 5C:
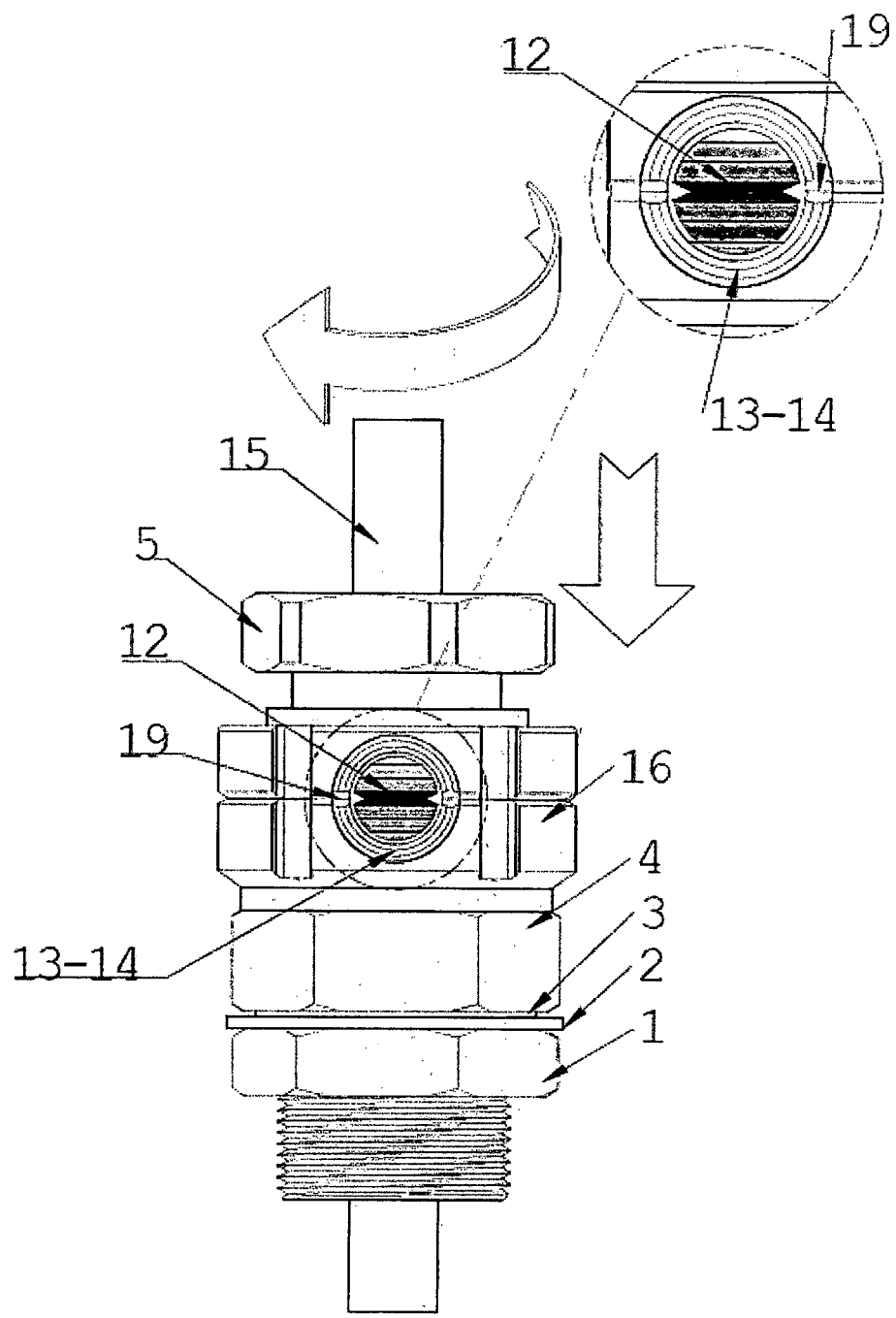
Figure 5D:
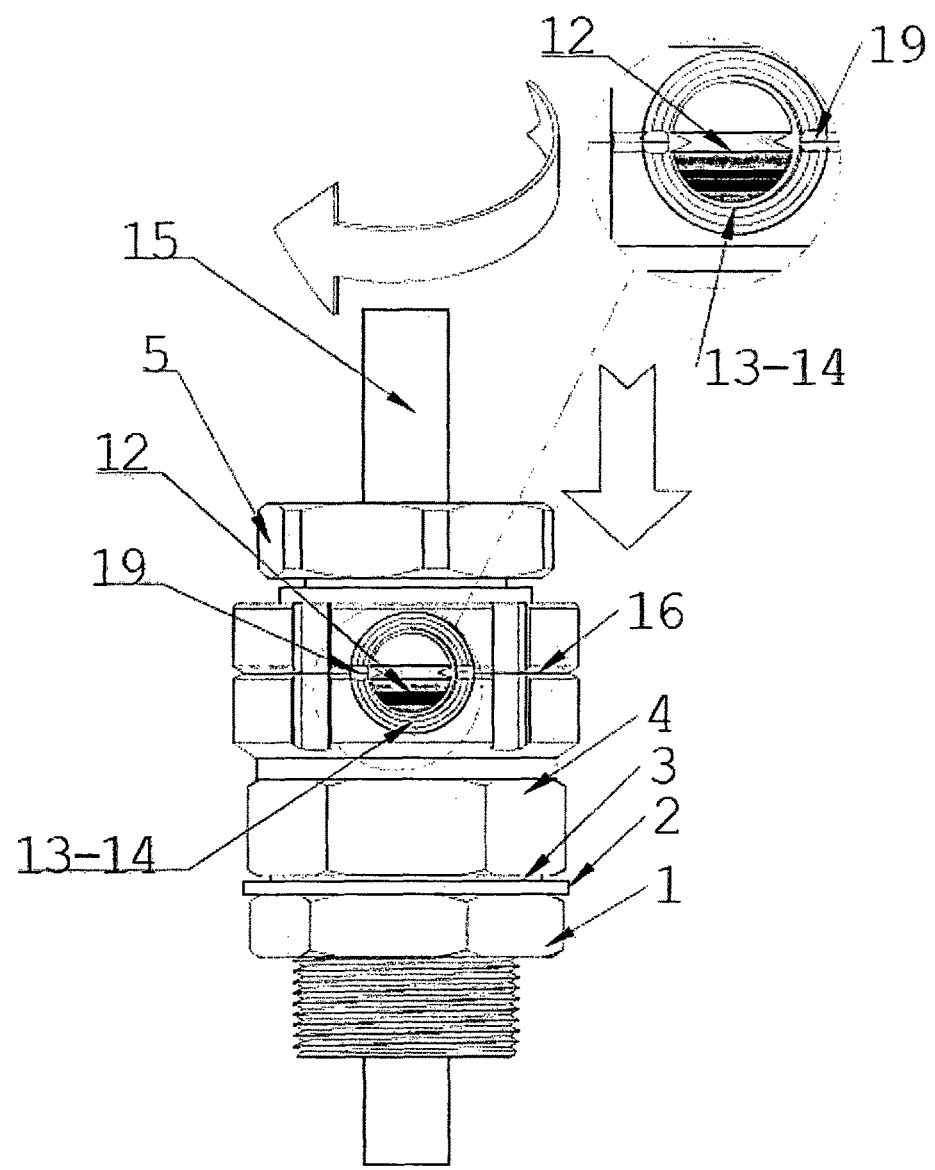

The FIG. 4 is a longitudinal section (partial) view of the cable gland of the present invention;

The FIGS. 4a and 4b are a longitudinal section (partial) view of another modality of the cable gland of the present invention, with screwing systems inverted, respectively;

The FIGS. 5a to 5d are detailed views of the cable gland of the present invention operating.

The FIGS. 6 and 6a to 6e refers to optical elements models and box/case.

Figure 1:
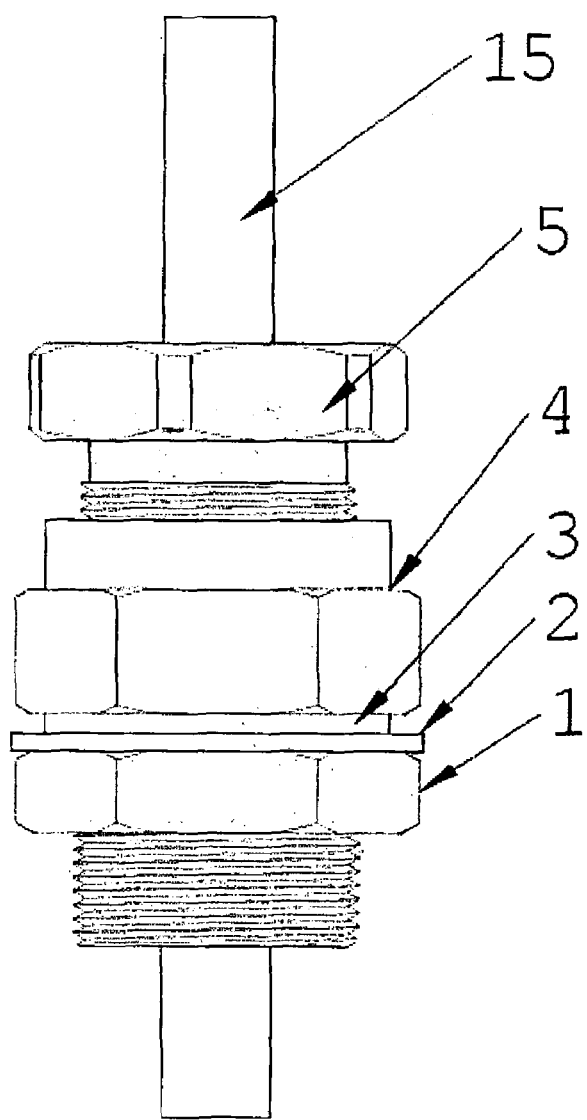
Figure 1A:
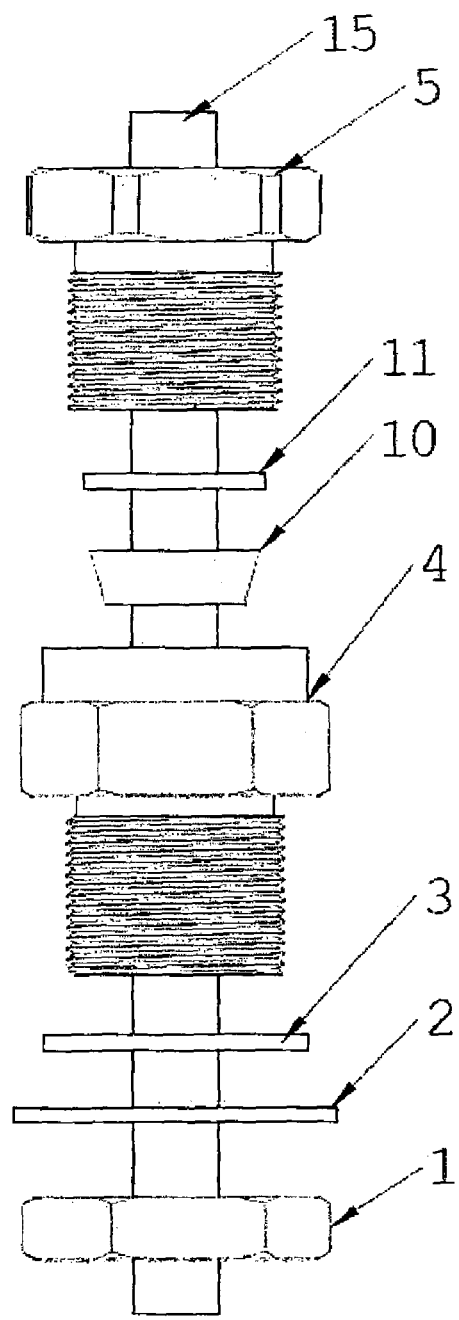

The FIGS. 1 and 1a (previous technique) and FIGS. 2, 2a, 4, 4a, 4b, 5a, 5b, 5c, 5d (present invention) show models of cable glands utilized on entries for non-armored electric cables (without grounding grid). These models, meeting the security requirements prescribed in norms, can be certified for use in classified or non-classified areas.

The model of the FIG. 4a does not use thread or lock nut for fixation, because is soldered directly on site. This model is generally used in vessels. The other models are generally used on equipment entries.

DESCRIPTION OF THE ITEMS OF THE FIGURES

1—Locknut
2—Structure of the equipment
3—Sealing ring of the connection thread
4—Body
5—Sleeve
6—Fixing ring of mesh
7—Intermediate locknut
8—Inner sealing ring 9—Slip washer internal sealing ring
10—Outer sealing ring
11—Sliding washer
12—Scale
13—Optical element
14—Optical element box
15—Non-armored electric cable
16—Reference ring
17—Armored electric cable
18—Cone fixing mesh
19—Marker

DETAILED DESCRIPTION OF THE INVENTION

The present invention refers to, in short, to a cable gland that comprehends a configuration that provides conditions for utilization and installation with precision and acuity, in clear differentiation in relation to the models that composes the previous technique.

For a better understanding of the object of the present invention, it is necessary a brief explanation about the installation process of the cable gland. With the electric cable properly prepared for utilization/installation in a hole of the equipment, junction box and/or partition that need a cable gland, the user/installer confirms if the sealing ring of the connection thread (3) is fitted on the body thread (connection thread) (4) of the cable gland.

If the location where the cable gland will be inserted is a hole with a thread, the user/installer fits the cable gland and gives the first laps on the hexagon of the body (4) using the hand, and then start rotating it with an appropriate wrench until the final pressure. If the hole or orifice that will receive the cable gland don't have a thread, is utilized a locknut (1) and an appropriate wrench to hold it, while another wrench rotates the body (4) until the final pressure for fixation of the cable gland on the equipment, junction box and/or partition.

Installing the cable gland, with the sleeve (5) totally loose, the electric cable is introduced on the cable gland, letting in the sufficient amount of cable previously prepared for the equipment interior, junction box and/or partition. Is fitted a appropriate wrench on the hexagon of the body (4) to immobilize in a way to keep the cable gland on the equipment, junction box and/or partition.

Then, with a second wrench, the sleeve (5) is tightened. As it rotates, it also penetrates in the body (4) and compresses the inner sealing ring (8), until the ideal sealing for the electrical cable used is reached.

The motion executed by de sleeve (5), of spinning and penetrating the body (4), is directly related to the point where the ideal sealing of the used cable is reached.

At this point, is found the differential provided by the present invention whose object consists in providing a cable gland that allows to the user/installer, by scale visualization (12) disposed on the interior of the cable gland, previously defined and compatible with the existing cables, viewable through an optical element (13) disposed in an optical element box (14) disposed on the outer wall of a section of the cable gland, regular to the screwing pressure of the cable gland, allowing in this way a safe and precise installation of it, without excessive or insufficient tightening.

For purposes of the present invention, the proposed cable gland has a scale that includes several gauges/cable diameters, with each cable (and its respective diameter) corresponding to an identification by color on the scale of the cable gland of the present invention.

After trespassing the cable through the cable gland, begins the screwing of the cable gland for isolate and fixate the installed cable, in which the type of the cable installed necessarily should comprehend to a color on the scale of the cable gland for purposes of precise screwing, isolating, and fixation.

On the existing cable glands, the tightening regulation is made without any criteria, usually until the tightening resistance is absolute, what actually can lead to breakage/damage of the cables.

On the other hand, the lack of tightening criteria often causes insufficient tightening, compromising the sealing.

On the cable gland of the present invention, the pressure to be exercised is determined by a scale (12) present on the interior of the cable gland and viewable by visualization through the optical element (13) disposed on the optical element box (14) of the register, by scale (12), when it reaches the reference on the reference ring (16).

As mentioned, the scale is enlarged through the optical element (13), to facilitate the perception of the technician/fitter/installer/user. The optical element box (14) is utilized for the protection of the optical element (13) when in the mounting of the product.

For better convenience of the fitter/installer/user, the reference ring (16) rotates without separating from the body, to allow that the scale can be seen from any angle and in any relative position, referred arrangement being present in all models of cable glands that illustrate the present invention, representing the first and second models by the FIGS. 2, 2a, 3, 4; a third by the FIG. 3a; and a fourth by the FIG. 3b.

As a differential, should be noticed that the model of the FIG. 4a, functionally works in the same way in relation to the model of the FIGS. 2, 2a, 3 and 4, in which the model of the FIG. 4a, the body (4) don't have outer thread on the inferior part since soldered directly on the cable entrances; and has no reference ring (16) to demonstrate that this item can be optional in some specific cases of models.

The cable gland of FIG. 4a is the same model of the FIG. 4b for same utilization and same mounting procedure. This configuration if very used on cable glands of injected plastic. However, the screwing system is inverted.

Figure 2:
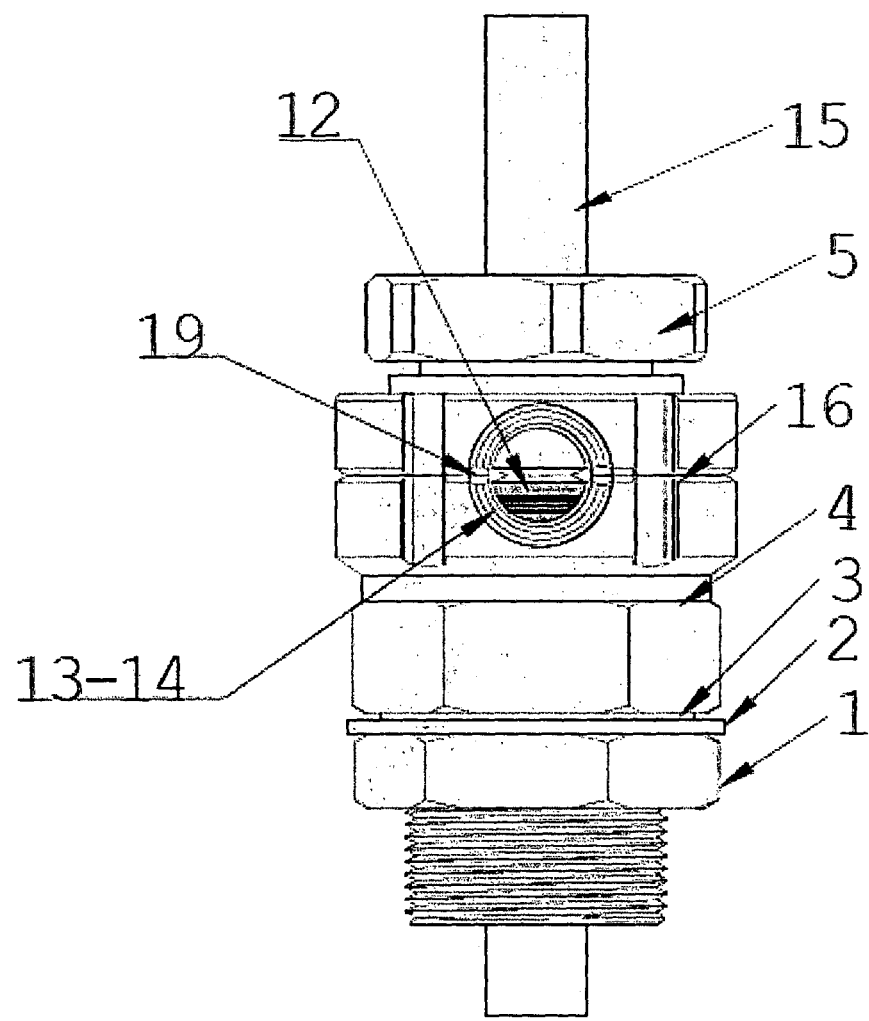
Figure 2A:
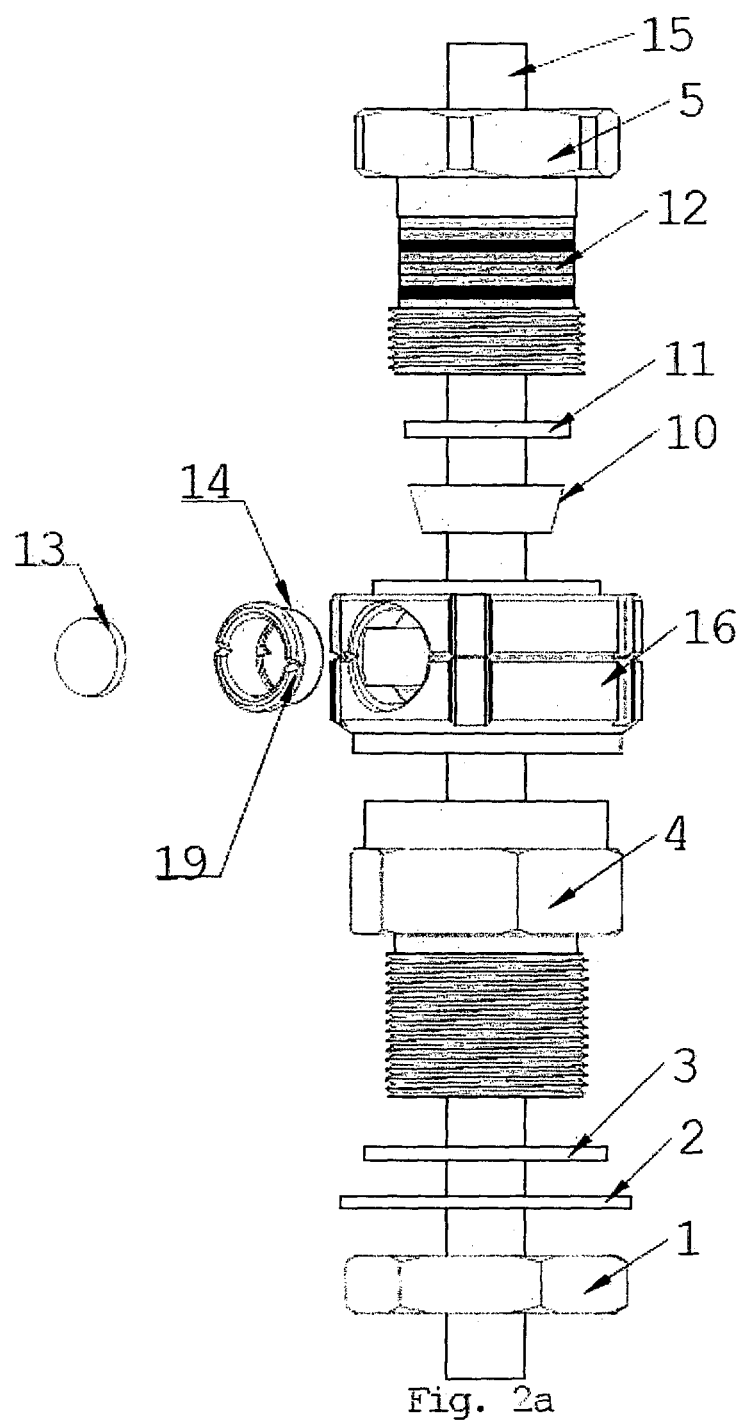

On the FIGS. 2 to 4, the sleeve (5) is built with outer thread and contains the scale (12) recorded on its body, while the body (4) is built with inner thread, a configuration type plug (sleeve(5))—socket (body(4)).

On the FIG. 4b the element sleeve (5) is built with inner thread and the body (4) with outer thread, with the scale (12) inserted on its body (4), in a configuration socket (sleeve)—plug(body).

On both cases the inner sealing ring (10) is compressed by the movement of the sleeve (5) with the evolution of the sealing by tightening or screwing, such progression observable through the optical element (13).

Figure 6:
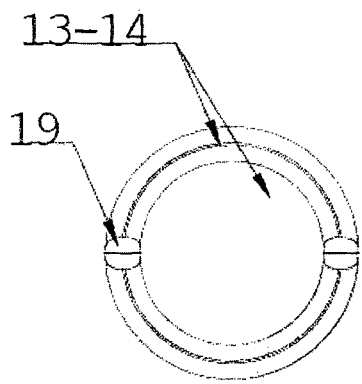
Figure 6A:
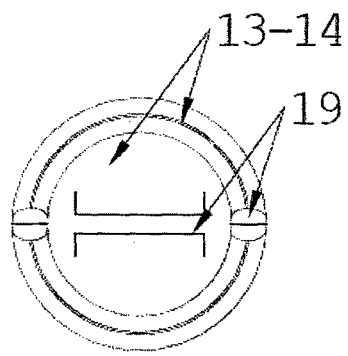
Figure 6B:
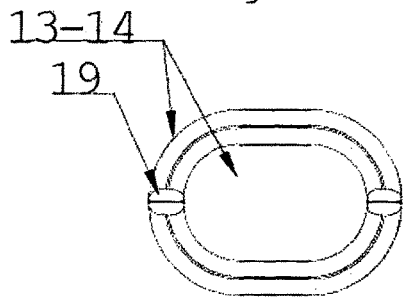
Figure 6C:
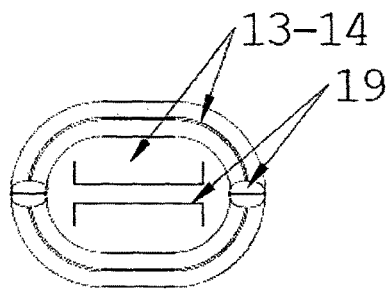
Figure 6D:
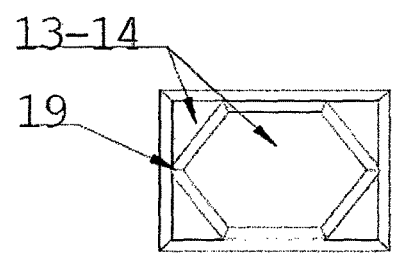
Figure 6E:
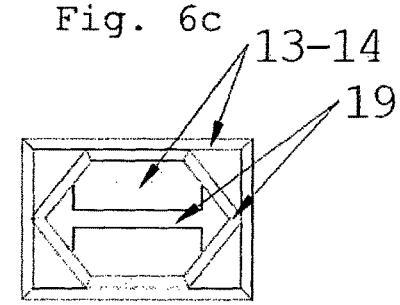

Still, the present invention provides feature available on the optical element, as illustrated by the FIGS. 6a and 6e that shows an element for the precise and correct visual verification of the fitter/installer/user, by observation in angle of 90° in relation to the optical element (13), of the exact positioning of the color range on scale.

Referred arrangement comprehends a precise marker on the surface of the optical element that demarcates a strip to the exact position of the color range on the scale corresponding to the tightening point for the cable that trespass the cable gland.

Thus, it is concluded a secure mounting with the record of the evidence of the cable seal.

The FIGS. 5a to 5d illustrate a progression of the mounting by screwing, evidencing the alteration of colors observed on the optical element as the screwing occurs.

On the preferred modality of the present invention, the cable gland with pressure indicator is basically characterized by comprising a scale (12) disposed on the sleeve (5) that fits on the body (4), the referred body (4) comprising a optical element box (14) with a optical element (13) inserted in section of its outer surface (16), the positioning of the referred section being determined in a way that the optical element box (14) is positioned above the scale (12) disposed on the sleeve (5), the outer body surface section (4) comprising a reference ring (16).

The scale can be selected from the group that consists in numbers, letters, references, colors, or mixtures of these, and the referred scale to be pre-configured according to the object to be utilized, in which the object to be used with the cable gland of the present invention is selected from the group that consists in electric cables, armored electric cables; tubes, ducts and/or rigid, semi-rigid or flexible pipes.

On the cable gland with pressure indicator of the present invention, the optical element (13) comprehends one or more markers (19), the marker (19) being disposed centrally on the optical element (13), in which the optical element box (14) and the optical element (13) have selected shapes from the group that consists in circle, rhombus, rectangle, quadrilateral, hexagon, trapezoid, pyramid, similar and/or combinations of the above identified shapes, in which the optical element (13) comprehends a magnifying lens, concave type.

The models of cable glands vary according to the cable to be installed, however being perfectly adaptable to the scale system and visualization proposed on the present invention for all of them.

Still, and in all the extension of what was previously explained, the object of the present invention can still be applied to tubes and ducts, rigid, semi-rigid or flexible, with relevant adaptations.

Referred tubes and ducts can comprehend tubes and ducts for transportation of gas, combustible, liquids in general, etc., being indispensable ensure perfect security to the sealing of the systems that are installed in the referred tubes and ducts.

The explanation above, despite wide, does not exclude other modalities that eventually can result from the present invention, as well as a differentiated constructive model or new characteristics, contemplated due to the practical development of the present invention, not being, therefore, limited to the present innovation to the topics described above.

The invention claimed is:

1. CABLE GLAND WITH PRESSURE INDICATOR, which comprises a scale (12) disposed on a sleeve (5) that fits in a body (4), said body comprising an optical element box (14) with an optical element (13) inserted in section of its outer surface (16), the positioning of the section being determined in a way that the optical element box (14) be positioned above the scale (12) disposed on the body (4).

2. CABLE GLAND WITH PRESSURE INDICATOR, according to the claim 1, wherein the section of the outer body surface (4) comprises a reference ring (16).

3. CABLE GLAND WITH PRESSURE INDICATOR, according to the claim 1, wherein the optical element (13) comprises one or more markers (19).

4. CABLE GLAND WITH PRESSURE INDICATOR, according to the claim 1, wherein the scale is selected from the group that consists in numbers, letters, colors, symbols, or mixtures thereof.

5. CABLE GLAND WITH PRESSURE INDICATOR, according to the claim 1, wherein the scale is preconfigured according to the model of the cable gland.

6. CABLE GLAND WITH PRESSURE INDICATOR, according to the claim 1, wherein an object to be utilized with the cable gland is selected from the group that consists in: electric cables, armored electric cables; tubes, ducts and/or rigid, semi-rigid or flexible pipes.

7. CABLE GLAND WITH PRESSURE INDICATOR, according to the claim 3, wherein the marker (19) is disposed centrally on the optical element (13).

8. CABLE GLAND WITH PRESSURE INDICATOR, according to the claim 3, wherein the optical element box (14) and the optical element (13) have shapes selected from the group that consists in: circle, rhombus, rectangle, quadrilateral, hexagon, trapezoid, pyramid or combinations thereof.

9. CABLE GLAND WITH PRESSURE INDICATOR, according to the claim 8, wherein the optical element (13) comprises a magnifying lens.

10. CABLE GLAND WITH PRESSURE INDICATOR, according to the claim 9, wherein the optical element (13) comprises a concave lens.

11. CABLE GLAND WITH PRESSURE INDICATOR, according to the claim 1, wherein the scale (12) disposed on the sleeve (5) that fits in a body (4) is in an inverted position in relation to the sleeve (5).

12. CABLE GLAND WITH PRESSURE INDICATOR, according to the claim 4, wherein the scale is preconfigured according to the model of the cable gland.

* * * * *